United States Patent [19]

Ernst

[11] Patent Number: 4,549,808
[45] Date of Patent: Oct. 29, 1985

[54] MOVABLE APERTURE PHOTOELECTRIC MEASURING INSTRUMENT

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 490,584

[22] Filed: May 2, 1983

[30] Foreign Application Priority Data

May 19, 1982 [DE] Fed. Rep. of Germany ....... 3218903

[51] Int. Cl.[4] ..................... G01B 11/00; G01B 11/26
[52] U.S. Cl. .................................. 356/374; 356/373; 356/375; 250/237 G
[58] Field of Search ............... 356/333, 375, 400, 401, 356/152, 374; 250/237 G, 237 R

[56] References Cited

U.S. PATENT DOCUMENTS

4,045,141 8/1977 Moriyama et al. ............ 356/401
4,070,117 1/1978 Johannsmeier et al. ......... 356/401

FOREIGN PATENT DOCUMENTS

2023265 6/1975 Fed. Rep. of Germany .
2626363 12/1976 Fed. Rep. of Germany .
2004813 12/1969 France .
814323 6/1959 United Kingdom .
2067282 7/1981 United Kingdom .

*Primary Examiner*—R. A. Rosenberger
*Assistant Examiner*—Michael F. Vollero
*Attorney, Agent, or Firm*—Willian Brinks Olds Hofer Gilson & Lione Ltd.

[57] ABSTRACT

A photoelectric measuring instrument for determining position deviations of an object is provided with an illuminated aperture and an objective which cooperate to generate an image of the illuminated aperture on the object to be measured. The image of the illuminated aperture on the object is reflected by the object and in turn imaged onto the illuminated aperture. This aperture is firmly connected with a measuring graduation which is scanned by a scanning unit to measure the position of the aperture. In the preferred embodiments, both the aperture and the graduation are formed by photolithographic techniques on a photoimpermeable layer which is carried by a transparent plate.

15 Claims, 10 Drawing Figures

MOVABLE APERTURE PHOTOELECTRIC MEASURING INSTRUMENT

BACKGROUND OF THE INVENTION

The present invention relates to a photoelectric length measuring instrument for measuring changes in position of an object, of the type wherein an optical system is provided for projecting the image of an aperture onto the object, and for projecting a reflected image of this aperture back from the object to the instrument.

German Pat. No. 20 23 265 discloses a prior art photoelectric measuring system for the determination of changes in position of an object, in which a periodically oscillating illuminated aperture is provided for scanning the object to be measured. An optical system is provided for imaging the oscillating image of the aperture projected onto the object back on to the oscillating aperture. This oscillating aperture simultaneously functions as a source of illumination light and as a scanning element. The oscillating aperture periodically scans the position of the aperture image in its oscillation plane. The position of this image represents a measure of the change of the position of the object to be measured. In order to allow relatively large position deviations of the object to be measured, the oscillating system is arranged slidably in the field of view of the reproducing optical system. For the determination of the displacement path, this oscillating system is mechanically coupled with a length measuring system.

In this prior art measuring system, the oscillating aperture is fastened to a vibrating or oscillating string. This oscillating system requires for its excitation an electro-mechanical oscillator. The amplitude of oscillation is regulated by means of a velocity sensor which supplies an input signal to a servo system which symmetrically adjusts the oscillating aperture with respect to the perpendicular which extends from a mirror connected to the object to be measured and passes through the center of the reproduction objective lens. Furthermore, a separate length measuring system is required for the determination of the displacement of the oscillating aperture.

SUMMARY OF THE INVENTION

The present invention is directed to an improved photoelectric measuring system of the general type described above which provides substantially simplified construction without a reduction in measuring accuracy.

According to this invention, a photoelectric length measuring instrument of the general type described above is provided with means for defining at least one measuring graduation mounted to the at least one aperture to move with the aperture. A scanning unit is mounted to scan the at least one measuring graduation to measure the position of the graduation and thereby of the aperture. In one preferred embodiment of this invention, the image of the light emitting aperture is reflected off of the object being measured and is projected onto a second, receiving aperture rather than onto the first aperture. The second receiving aperture is aligned with the first aperture such that the position of the second aperture at which the reflected image of the first aperture coincides with the second aperture is a measure of the position of the object being measured. In this embodiment, a measuring graduation is mounted to the first and second apertures to move with these apertures, and a scanning unit is mounted to scan the measuring graduation to measure the position of the graduation and thereby of the first and second apertures. This invention provides the important advantage that it makes possible an improved measuring instrument having a large measuring range which operates at high accuracy and can be fabricated economically. Further advantageous features of this invention are set forth in the dependent claims defined below.

The invention itself, together with further objects and attendant advantages, will best be understood by reference to the following detailed description taken in conjunction with the accompanying drawings.

BRIEF DESCRIPTION OF THE DRAWINGS

FIG. 3b is a sectional view taken along lines 3b—3b of FIG. 3a.

FIG. 7b is a sectional view taken along line 7b—7b of FIG. 7a.

FIG. 7c is side elevational view taken along line 7c—7c of FIG. 7a.

DETAILED DESCRIPTION OF THE PRESENTLY PREFERRED EMBODIMENTS

Figure 1:
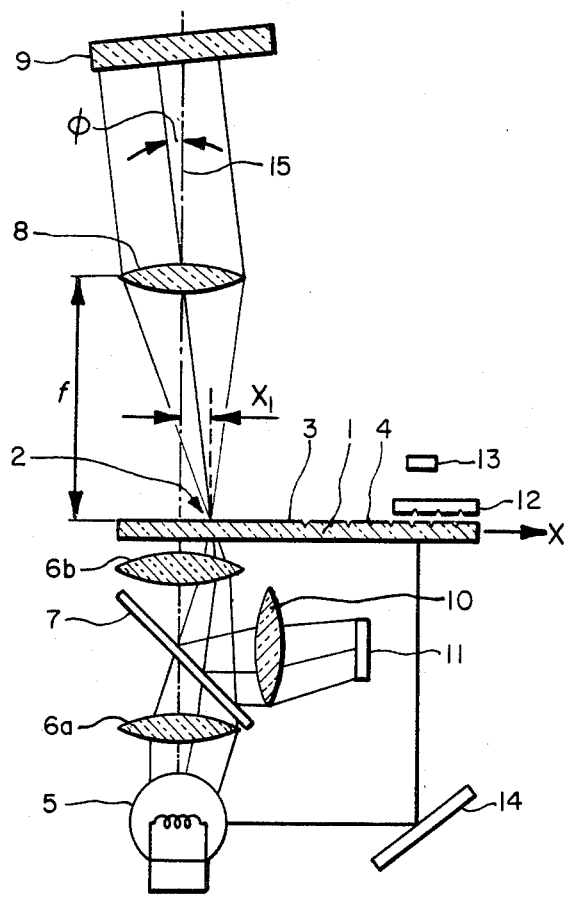
FIG. 1 is a schematic representation of a measuring instrument which incorporates a first preferred embodiment of this invention.

Turning now to the drawings, FIG. 1 is a schematic representation of a measuring instrument which incorporates a first preferred embodiment of this invention. This measuring instrument includes a transparent plate 1 which acts as a carrier for an opaque, photoimpermeable diaphragm 3. This diaphragm 3 refines an aperture 2 and a measuring graduation 4. The aperture 2 is illuminated by means of a lamp 5. Light from the lamp 5 passes through lenses 6a, 6b and a beam splitter 7 before impinging on the aperture 2. The light rays emerging from the aperture 2 pass through a reproduction objective lens 8 and are projected onto a plane mirror 9, which is fastened to an object (not shown) to be measured. The image of the aperture 2 which is reflected by the plane mirror 9 passes through the reproduction objective lens 8 and is re-imaged in the focal plane of the reproduction objective lens 8 in the plane of the plate 1. The aperture 2 serves as a scanning element for this reflected image of the aperture 2. Light rays which pass from the mirror 9 through the aperture 2 are projected by the objective 6b, the beam splitter 7, and the lens 10 onto a photosensor 11. This photosensor serves to evaluate the amplitude of the light passing from the mirror 9 through the aperture 2 during scanning.

The graduation 4 is scanned photoelectrically with the aid of a scanning plate 12 that defines at least one division field which corresponds to the graduation 4. A corresponding number of photoelements 13 measure the amplitude of light which passes from the lamp 5 by means of a mirror 14 through the graduation 4 and the scanning plate 12.

Figure 2:
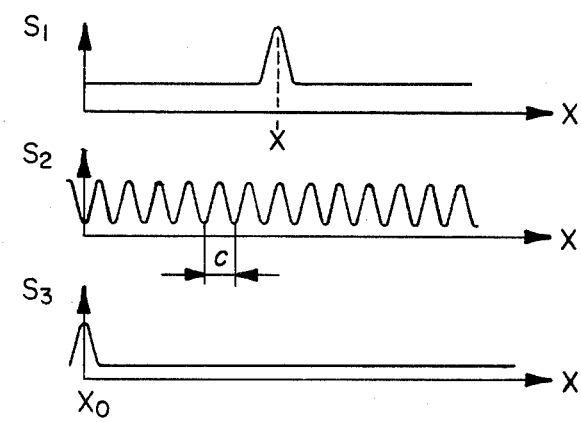
FIG. 2 is a waveform diagram of three signals generated by the embodiment of FIG. 1.

As shown in FIG. 1, the normal axis to the plane mirror 9 encloses an angle $\phi$ with the optical axis 15 of the autocollimator. In order to allow the determination of the magnitude of this angle $\phi$, the transparent plate 1, with the aperture 2 and the graduation 4 thereon, is slidably arranged obliquely to the longitudinal extent of the aperture 2. As the plate 1 moves in the X direction, there is a certain position $X_1$ at which the aperture 2 is positioned such that the reflection of the aperture 2 generated at the focal plane of the lens 8 coincides with the position of the aperture 2, and thereby allows the reflected light rays to pass via the beam splitter 7 onto the photosensor 11. During the scanning operation, displacement of the plate 2 brings about a modulation of the light beam falling on the photosensor 13. The photosensor 13 generates a periodic output signal $S_2$ which is a measure of the position of the plate 2 and can be evaluated in a known manner and applied to a counter which acts to count cycles of the signal $S_2$. As shown in FIG. 2, The output signal $S_1$ of the photosensor 11 indicates when the reflected image of the aperture 2 coincides with the position of the aperture 2. The output signal $S_2$ of the photosensor 13 is a periodic signal as described above indicative of the movement of the plate 2. The position $X_1$ of the plate 2 at which the aperture image coincides with the aperture can be determined from the relation $X_1 = Z_1 \cdot C$, in which $Z_1$ signifies the number of cycles (light-dark periods) of the periodic signal $S_2$ generated by the photosensor 13 and C signifies the grid constant of the division 4. The angle $\phi$ can then be determined according to the following relationship:

$$\phi = \arctan X_1/f,$$

wherein f equals the focal length of the reproduction objective lens 8. For small angles, the following approximation obtains:

$$\phi = X_1/f = Z_1 \cdot C/f.$$

The focal length f and the grid constant C can be expediently chosen in such a way that one counting step of the counter (one cycle of the signal $S_2$) corresponds to the desired measuring step of the angle $\Delta\phi$ as follows:

$$\Delta\phi = C/f.$$

If need be, the period of the graduation 4 can be subdivided accordingly to known methods by the factor N. For example, several scanning fields can be arranged phase shifted with respect to one another on the scanning plate 12 and associated photosensors can be used to measure smaller measuring steps $\Delta\phi = C/(N \cdot f)$. The zero position $X_0$ of the measuring magnitude X can be obtained or reproduced by scanning reference marks 16 associated with the graduation 4 on the plate 1 by means of a photosensor (not shown). In FIG. 2, the signal $S_3$ indicates the manner in which the output of this photosensor peaks at the selected zero position $X_0$.

Figure 3A:
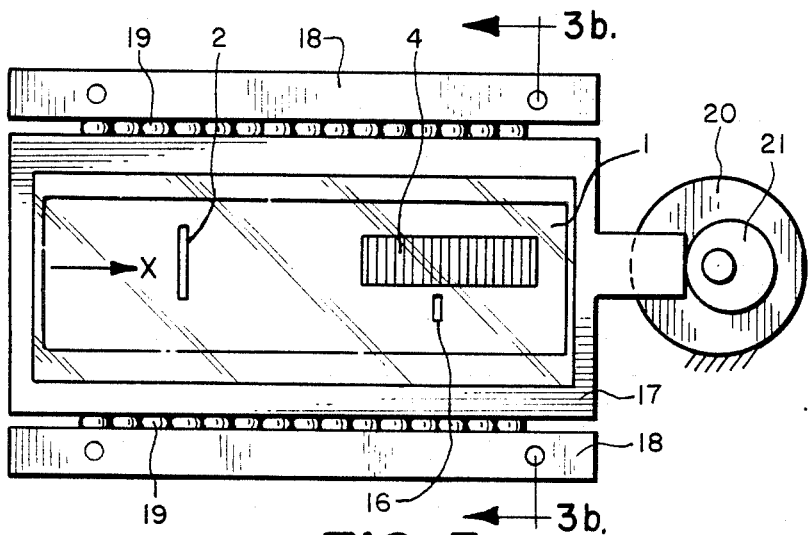
FIG. 3a is a plan view of a first aperture plate suitable for use in the embodiment of FIG. 1.
Figure 3B:
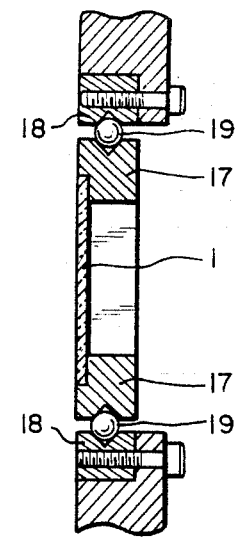

As shown in FIGS. 3a and 3b, the transparent plate 1 which defines the aperture 2, the graduation 4, and the reference mark 16 is in this embodiment fastened to a carrier 17 which is linearly guided in a frame 18 by means of spheres 19. The movement of the plate 1 in the X direction (perpendicular to the longitudinal extent of the aperture 2) is an oscillatory movement which is driven by a motor 20. This motor 20 rotates an eccentric 21 that serves to shift the carrier 17 periodically in the X direction.

Figure 4:
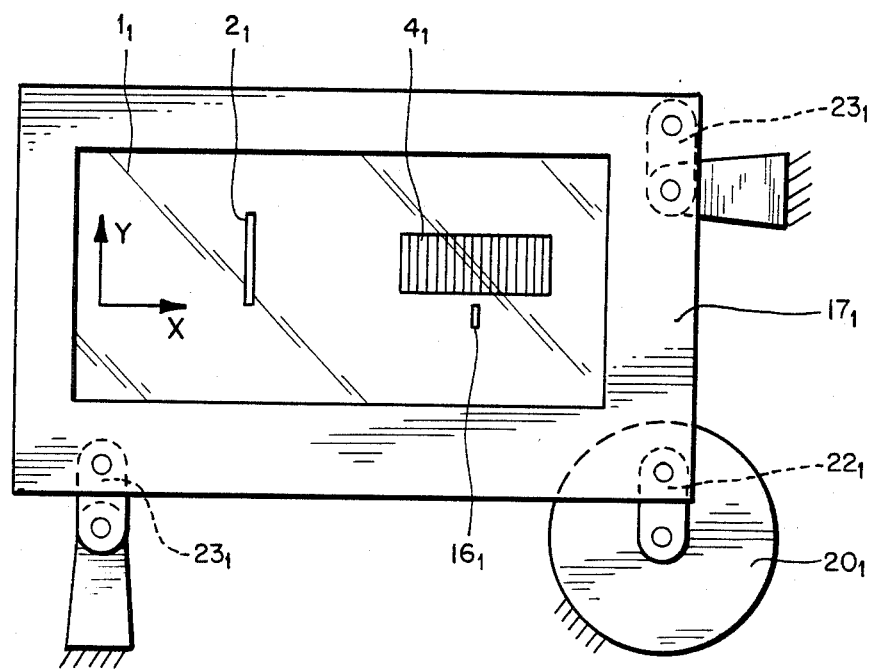
FIG. 4 is a plan view of a second aperture plate suitable for use in the embodiment of FIG. 1.

FIG. 4 shows an alternative embodiment of an aperture plate suitable use in the instrument of FIG. 1. As shown in FIG. 4, a plate $1_1$ is provided which defines an aperture $2_1$, a graduation $4_1$, and a reference mark $16_1$. This plate $1_1$ is fastened to a carrier $17_1$. A motor $20_1$ is provided which rotates a crank $22_1$. This crank $22_1$ is coupled to the carrier $17_1$, which is supported by two revolving rocker arms $23_1$. With this linkage, the motor $22_1$ drives the carrier $17_1$ in a two dimensional, periodic, translatory movement in the X and Y directions of a predetermined coordinate system: In this embodiment, the rocker arms $23_1$ are the same length as the crank $22_1$ and are arranged parallel to the crank $22_1$. The rocker arms $23_1$ and the cranks $22_1$ are pivotally mounted to articulate on the carrier $17_1$.

Figure 5:
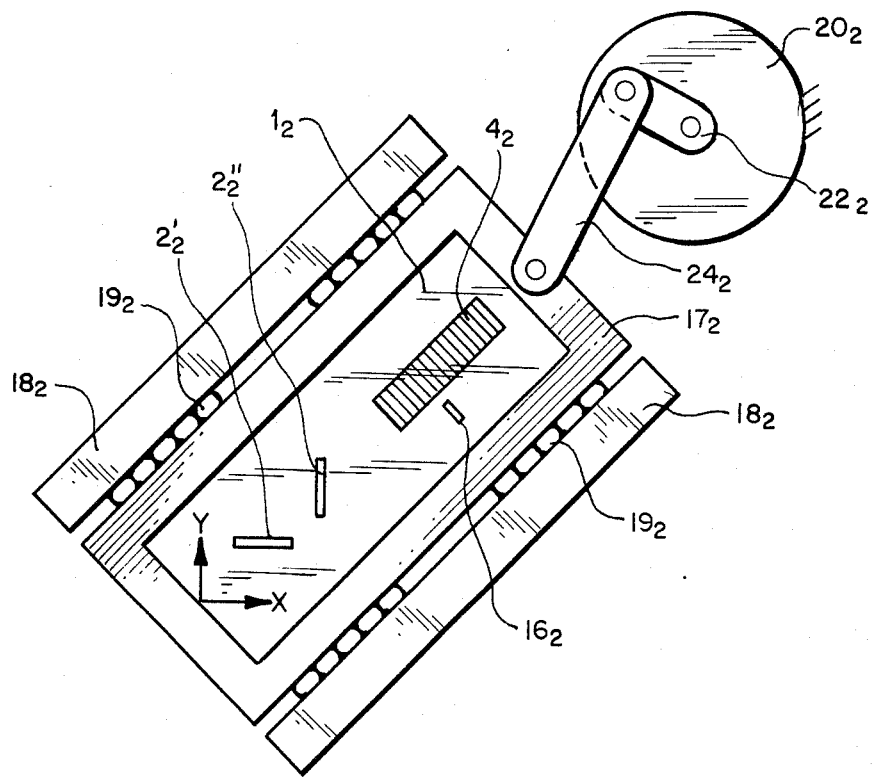
FIG. 5 is a plan view of a third aperture plate suitable for use in the embodiment of FIG. 1.

FIG. 5 shows a schematic representation of a third aperture plate suitable for use in this invention. As shown in FIG. 5, a plate $1_2$ is provided which defines two elongated apertures $2_2'$, $2_2''$ which are oriented perpendicularly to one another. The plate $1_2$ also defines a graduation $4_2$ and a reference mark $16_2$. The plate $1_2$ is mounted on a carrier $17_2$ which is linearly guided in a frame $18_2$ by means of spheres $19_2$. The plate $1_2$ is guided along the direction oriented at an angle $\pi/4$ with respect to a predetermined X and Y coordinate system. The plate $1_2$ is oscillated along this direction by means of a motor $20_2$ which rotates a crank $22_2$. This crank $22_2$ is connected to the carrier $17_2$ by a connecting rod $24_2$ which is articulated on the carrier $17_2$. The aperture $2_2'$ is oriented in the X direction and the aperture $2_2''$ is oriented in the Y direction of the coordinate system, so that the apertures $2_2'$, $2_2''$ move successively obliquely through their longitudinal extents through the optical axis of the measuring instrument as the plate $1_2$ is displaced periodically by the motor $20_2$. By means of the graduation $4_2$ and the reference mark $16_2$, the position of the two apertures $2_2'$, $2_2''$ is measured, so that the angular position of the plane mirror connected with the object to be measured can be determined in both coordinate directions.

Figure 6:
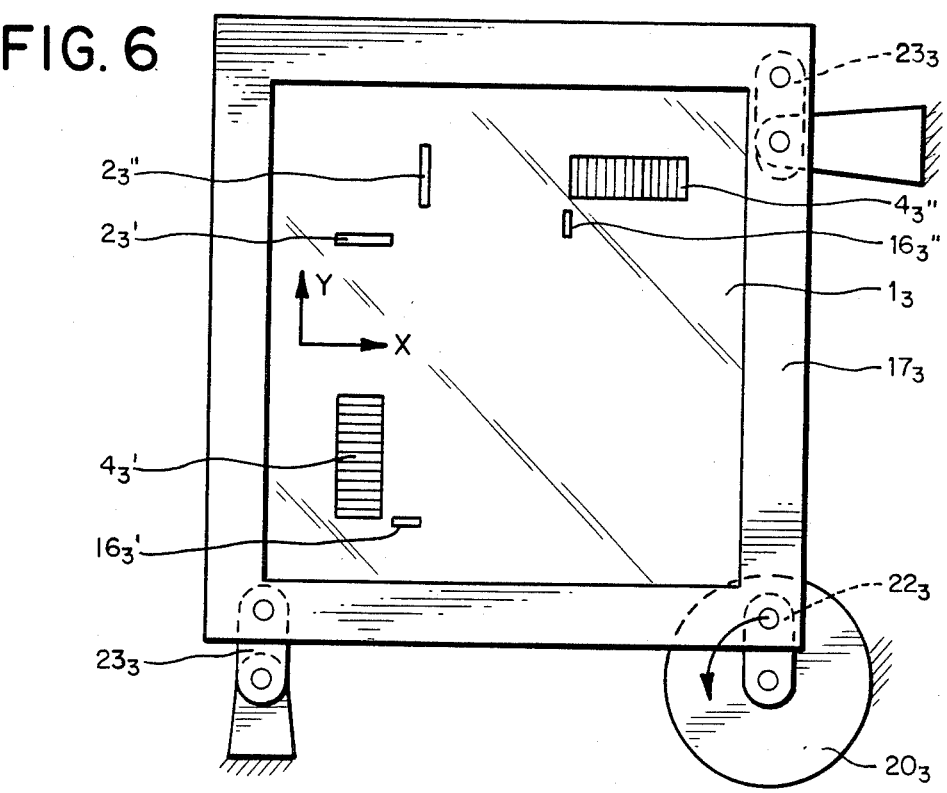
FIG. 6 is a plan view of a fourth embodiment of an aperture plate suitable for use with this invention.
Figure 7A:
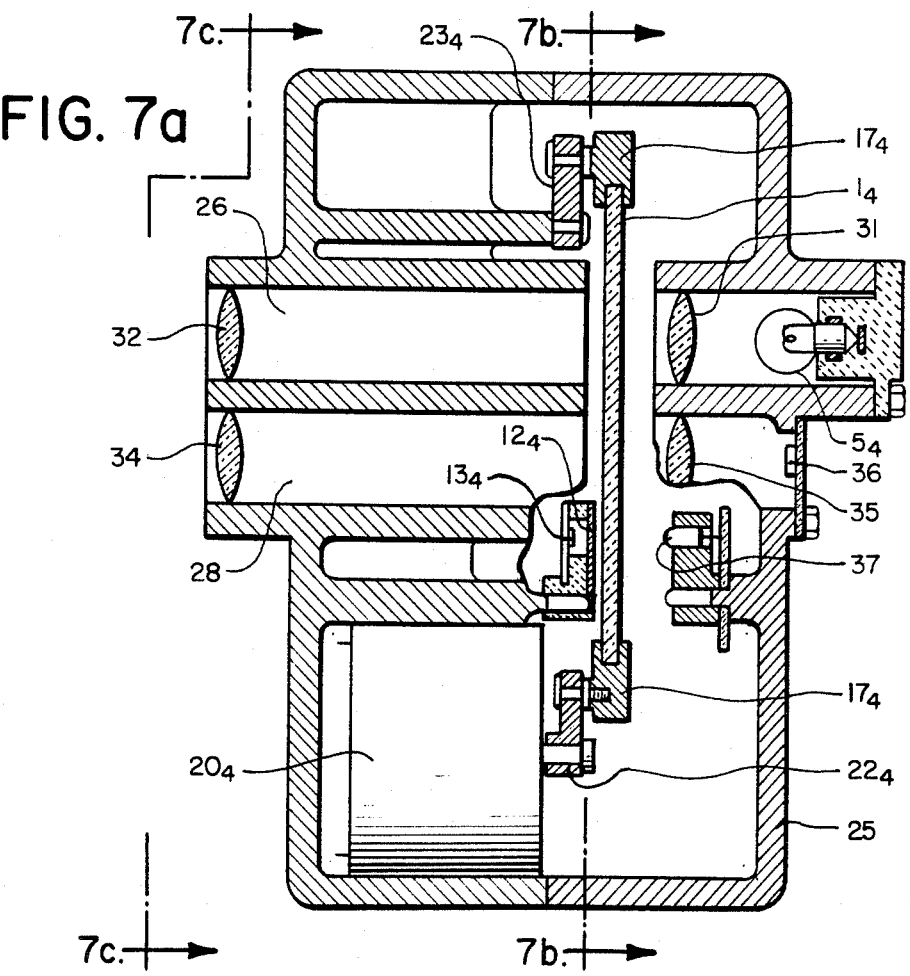
FIG. 7a is a sectional view of a fifth preferred embodiment of this invention taken along lines 7a—7a of FIG. 7b.
Figure 7B:
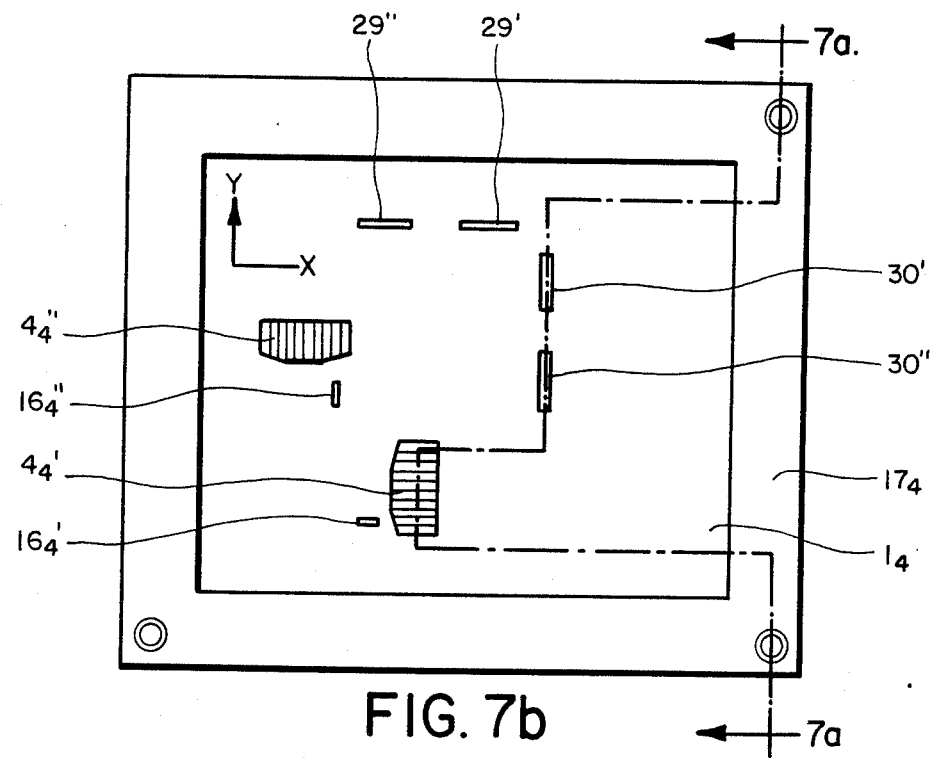
Figure 7C:
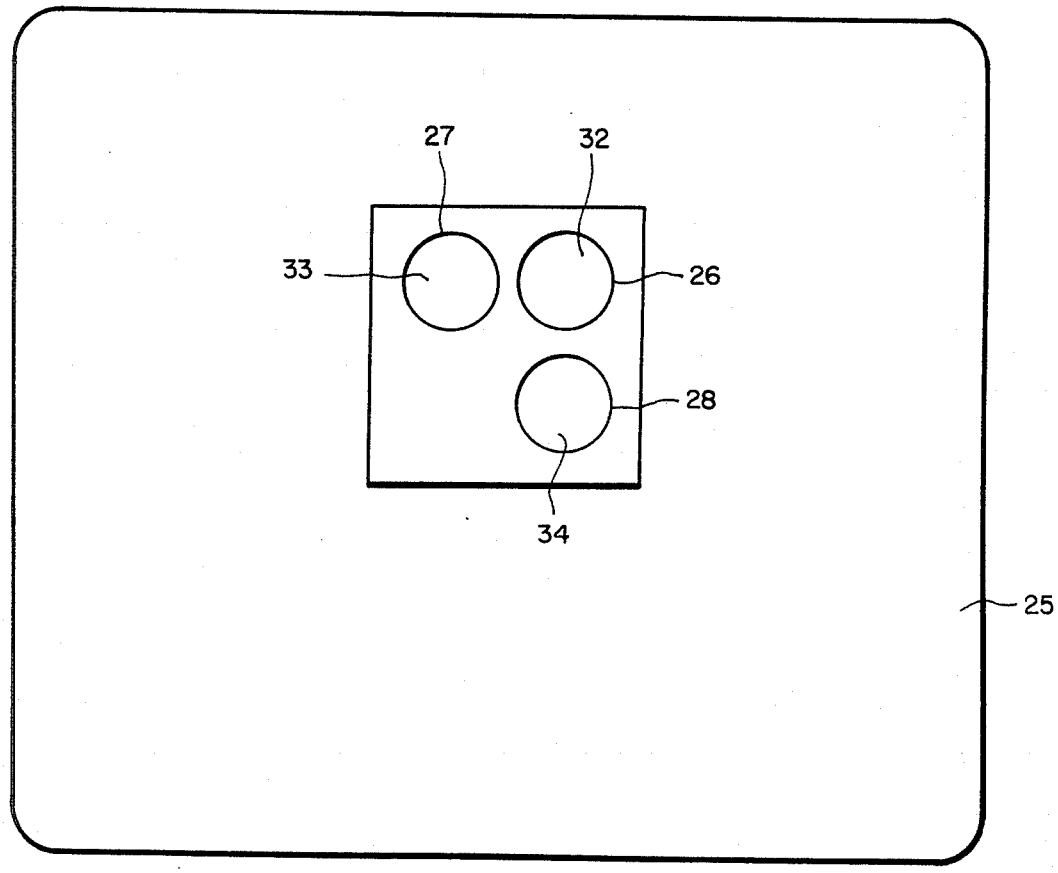

FIG. 6 shows a schematic representation of a fourth embodiment of an aperture plate suitable for use with the invention. As shown in FIG. 6, a plate $1_3$ is provided which defines two apertures $2_3'$, $2_3''$ oriented perpendicularly to one another. This plate $1_3$ is mounted on a carrier $17_3$, which is moved in a periodic pattern by means of a motor $20_3$. This motor $20_3$ rotates a crank $22_3$ which is coupled in an articulated manner to the carrier $17_3$. The carrier $17_3$ is further supported by two revolving rocker arms $23_3$, such that the carrier $17_3$ undergoes a two dimensional, periodic, translatory movement in the X and Y directions of a given coordinate system as the crank $22_3$ is rotated by the motor $20_3$. The rocker arms $23_3$ are the same length as the crank $22_3$ and are arranged parallel to the crank $22_3$. The rocker arms $23_3$ and the crank $22_3$ are articulated on the carrier $17_3$. A graduation $4_3'$ and a reference mark $16_3'$ are mounted on the plate $1_3$ and are associated with the aperture $2_3'$. An additional graduation $4_3''$ and an associated reference mark $16_3''$ are also mounted on the plate $1_3$ and associated with the aperture $2_3''$. The longitudinal extent of the aperture $2_3'$ is oriented in the X direc- 5. The invention of claim 2 wherein the plate further comprises means for defining a reference mark aligned with the at least one measuring graduation.

6. The invention of claim 5 wherein the plate comprises a patterned opaque layer which defines the first and second apertures, the at least one graduation, and the reference mark.

7. A photoelectric length measuring instrument for measuring changes in position of an object, said instrument comprising:
a first aperture;
a second aperture aligned with the first aperture;
optical means for projecting an image of the first aperture onto the object and a reflected image of the first aperture from the object to the second aperture such that the position of the second aperture at which the reflected image of the first aperture coincides with the second aperture is a measure of the position of the object;
a measuring graduation mounted to the first and second apertures to move with the first and second apertures; and
a scanning unit mounted to scan the measuring graduation to measure the position of the graduations and thereby of the first and second apertures.

8. The invention of claim 7 wherein the first and second apertures and the measuring graduation are applied to a common transparent plate.

9. The invention of claim 8 further comprising means for moving the plate in a circular movement.

10. The invention of claim 8 wherein the plate further defines a third emitting aperture and a fourth receiving aperture, each oriented perpendicularly to the first and second apertures; wherein the plate further defines an additional measuring graduation associated with the third and fourth apertures; and wherein the invention further comprises means for guiding the plate in circular movement.

11. The invention of claim 8 wherein the plate further defines a third emitting aperture and a fourth receiving aperture, each oriented perpendicularly to the first and second apertures; wherein the measuring graduation is oriented obliquely to the first, second, third, and fourth apertures; and wherein the invention further comprises means for guiding the plate in one dimensional periodic translatory movement obliquely to the first, second, third, and fourth apertures.

12. The invention of claim 8 wherein the plate further comprises means for defining a reference mark aligned with the measuring graduation.

13. The invention of claim 12 wherein the plate comprises a patterned opaque layer which defines the first and second apertures, the graduation, and the reference mark.

14. In a photoelectric length measuring instrument for measuring changes in position of an object, said instrument comprising at least one aperture, and an optical system for projecting an image of the at least one aperture onto the object and a reflected image of the at least one aperture from the object back to the at least one aperture such that the position of the at least one aperture at which the reflected image of the at least one aperture coincides with the at least one aperture is a measure of the position of the object, the improvement comprising:
means for defining at least one measuring graduation mounted to the at least one aperture to move with the at least one aperture, said aperture and measuring graduation applied to a common transparent plate;
a scanning unit mounted to scan the at least one measuring graduation to measure the position of the graduation and thereby of the at least one aperture; and
means for moving the plate in a circular movement.

15. The invention of claim 14 wherein the at least one aperture comprises two apertures defined by the plate and oriented transversely to one another; and wherein the at least one measuring graduation comprises two measuring graduations defined by the plate, each allocated to a respective one of the two apertures.

* * * * *